Oct. 20, 1931.   L. J. THOMAS   1,828,209
PISTON RING
Filed May 16, 1930   2 Sheets-Sheet 1

Inventor:
Leslie J. Thomas
by Heard Smith & Tennant
Attys.

Oct. 20, 1931. L. J. THOMAS 1,828,209
PISTON RING
Filed May 16, 1930 2 Sheets-Sheet 2

Inventor.
Leslie J. Thomas
by Heard Smith & Tennant.
Attys.

Patented Oct. 20, 1931

1,828,209

UNITED STATES PATENT OFFICE

LESLIE J. THOMAS, OF ARLINGTON HEIGHTS, MASSACHUSETTS, ASSIGNOR TO MRS. VERA C. BATCHELDER, OF ARLINGTON, MASSACHUSETTS

PISTON RING

Application filed May 16, 1930. Serial No. 452,931.

This invention relates to piston rings of the type used in internal combustion engines or other fluid expansion engines and is particularly directed to a method of increasing the seal of the ring with its groove and the cylinder wall.

A simple one piece ring is inefficient for many reasons. One of the chief reasons lies in the failure of the ring to effectively seal the ring groove. It is the chief object of this invention to provide a ring which effectively seals the ring groove.

A further object of the invention is to provide a piston ring which is highly efficient and at the same time of maximum durability.

The object of the invention is further to provide a ring which supports the piston in its normal axial position thereby preventing rocking or slapping of the piston within the cylinder.

A further object of the invention is to provide a ring having an element which functions with a wedging action to retain one of its end faces in resilient engagement with a side wall of the groove.

A further object of the invention is to provide a piston ring which incorporates a separate expansion member to increase the peripheral pressure of the ring against the cylinder wall together with a second expanding element which functions by means of a wedging action to force an end face of the ring into engagement with a side wall of the groove.

Other objects and features will more fully appear from the following description in connection with the accompanying drawings and will be particularly pointed out in the claims.

Figure 1:
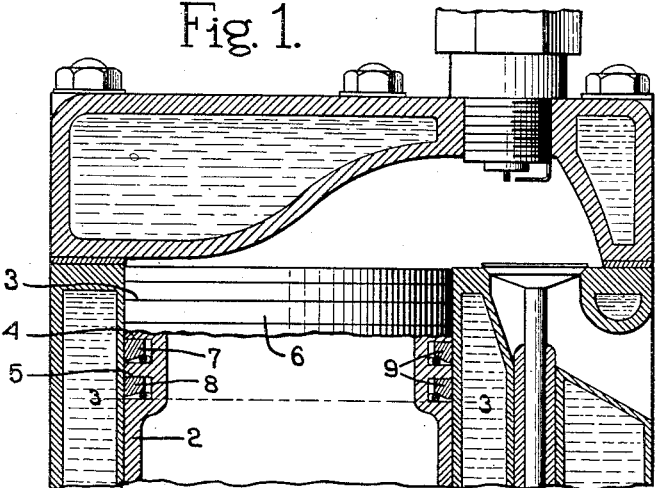
Fig. 1 is a cross section of a portion of a cylinder of an internal combustion engine in which the piston thereof is provided with piston rings embodying a preferred form of the invention.

In all types of internal combustion engines, and especially in those types employing high compression it has been proven that the action of the piston within the cylinder is far from efficient due to the fact that the piston fails to retain the desired high pressure within the cylinder by reason of leakage of the gas between the cylinder walls and the piston. Since it is the function of the piston rings to check this leakage the piston ring has naturally been the point of attack for correcting this weakness. A weakness of the common one piece type of piston ring is its inability to prevent the passage of oil by way of the ring groove into the combustion chamber. The results of a surplus of oil reaching the combustion chamber is to readily form deposits of carbon therein which lowers the efficiency of the engine.

Many forms of piston rings have been experimented with, some of which have been used commercially with a measure of success. The fact remains, however, that the larger part of the cars being manufactured today are equipped with a simple one piece ring of rectangular cross section which are initially fitted as closely as possible to their respective grooves. The reason for the failure to generally adopt the special piston ring lies in the fact that they have proved impractical for one reason or another. Some of these rings have proved partially effective in sealing the high pressure within the cylinder, but have been too harsh in their action on the cylinder walls causing premature wear thereof, while other rings which have been experimented with have proved too delicate and for that reason are subject to breakage.

The present invention provides a practical ring which may be economically manufactured and which functions efficiently over a long period of time without injury to the cylinders. The ring embodying the invention is herein illustrated as applied to the usual type of internal combustion engine having a cylinder 1 within which reciprocates a piston 2. The piston 2 is provided with a plurality of ring grooves, the number of such grooves being immaterial. As herein shown there are three such grooves 3, 4 and 5 in which are received respectively the piston rings 6, 7 and 8.

The rings are of novel construction having a body portion 9 which is generally rectangular in cross section and of a width substantially to fill its respective ring groove, each ring being split in the usual manner at one point to provide for expansion and contraction thereof. One of the end faces 10 of the rings has a beveled portion 11 which forms an inwardly opening V-shaped recess 12 with the adjacent side wall 13 of the groove. The end face 10 of the ring may be beveled for its entire width or for only a portion thereof.

Figure 2:
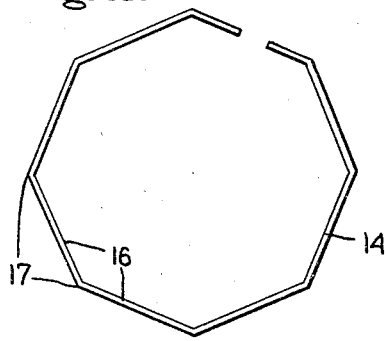
Fig. 2 is a view of a preferred form of expanding element which is incorporated into the design of the invention.
Figure 3:
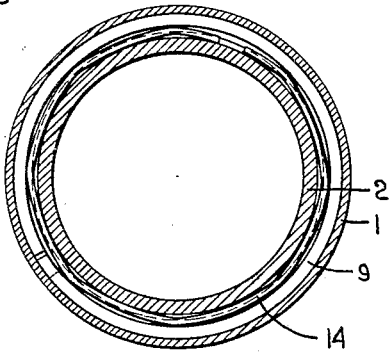
Fig. 3 is a cross section on line 3—3 Fig. 1 showing the disposition of the expanding member within the ring groove.
Figure 4:
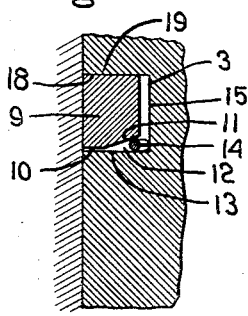
Fig. 4 is an enlarged cross sectional view showing a preferred embodiment of the invention.

The body portion 9 of the ring is inherently resilient and expands into peripheral engagement with the cylinder wall. The portion 9, therefore, functions in the same manner as a simple one piece ring. To supplement the action of the portion 9 an expansion member 14 preferably made of spring wire is provided and inserted in the ring groove between the bottom wall 15 thereof and the body portion 9. The member 14 extends substantially for the full peripheral length of the groove and expands laterally outward bearing against the bottom wall 15 of the groove and extending into the recess 12. The member 14 is made expansible by bending it into a polygonal form or other form in which the member is bent alternately from one side to the other of a central median line. As shown in Fig. 2 the member 14 is formed with short straight sections which produces a ring-shaped polygon. The portions 16 midway between the corners 17 of the member 14 bear against the bottom wall of the groove while the corners 17 engage the beveled face 11 of the body portion 9 of the ring. As the piston with the ring is inserted in the cylinder the expanding member is distorted from its normal shape into a substantially circular form as shown in Fig. 3. The member 14 is thus placed under a substantial tension which acts to force the corners 17 thereof into the recess 12 between the unyielding side wall 13 of the groove and the beveled face 11 of the ring causing the end face 18 of the body portion 9 to be wedged into engagement with the opposite side wall 19 of the groove.

It will be noted that the expansive force of the member 14 is divided into two components as a result of the wedging action existing between the expanding member and the body portion 9. One of the components acts to force the body portion into engagement with the side wall 19 of the groove while the other component acts outwardly to increase the peripheral pressure of the body portion against the cylinder wall. By constructing the body portion with its inclined face 11 at an acute angle with the side wall of the groove, the component of force acting longitudinally of the piston to force the body portion against a side wall of the groove is greatly in excess of the other component. The above result is the ideal condition and is readily brought about in the manufacture of the ring by simply forming the beveled face at the proper angle.

As above pointed out when the expanding member 14 is inserted in the ring groove it becomes distorted into a substantially circular form. As a result of this condition the member 14 is in engagement with or in close proximity to the bottom wall 15 of the groove, the side wall 13 of the groove and the beveled face 11 thus forming an effective check acting to prevent the accumulation of oil in the groove in back of the body portion 9.

By means of the present invention the required pressure to seal the ring in its groove may be adjusted with relation to the outward pressure of the ring so as to have no substantially modifying effect on the inherent outward expansion of the body portion 9. The outward expansion of the body portion is therefore normal and is practically unaffected by the action of the expansion member 14. If it is desired, however, to increase the pressure of the body portion against the cylinder wall, the angle of the beveled portion 11 will be increased thus increasing the outward component of the force exerted by the expansion member.

Figure 5:
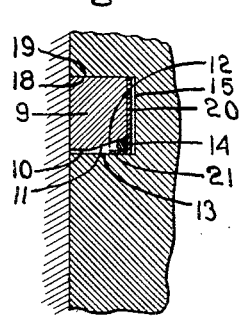
Figs. 5 and 6 illustrate modified forms of the invention.
Figure 7:
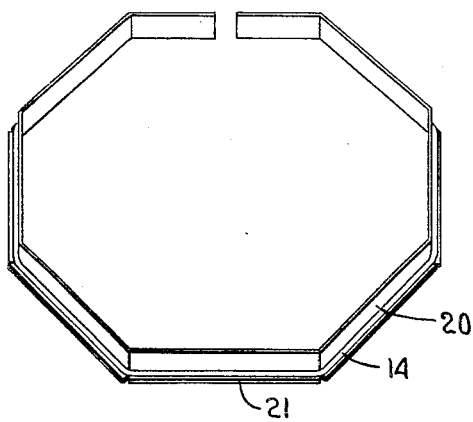
Fig. 7 is a perspective view of the means employed to expand the ring as shown in Fig. 5.

A modification of the structure above described is shown in Figs. 5 and 7 in which a polygonal or similar formed expanding member 20 is inserted between the bottom wall of the groove and the inner face of the body portion 9. This expanding member is L-shaped in cross section having its lateral section 21 adjacent to the beveled face of the body portion and engaging the side wall 13 of the groove. The chief function of the member 19 is to increase the lateral expansion of the body portion against the wall in case an abnormally high pressure at this point is desired. The expansion member 14 is inserted between the beveled face 11 and the angularly disposed inner faces of the L-shaped expansion member 20 and acts to wedge the body portion 9 against the side wall of the groove in the same manner as above described in connection with the ring as used without the member 20. The member 14, however, also engages the lateral portion 21 of the member 20 forcing it against the adjacent side wall of the groove. The lower face of the lateral portion is preferably nicely finished to form a close contact with the wall of the groove, and thereby aid in sealing the ring in its groove and excluding oil from the chamber behind the body portion 9.

Figure 6:
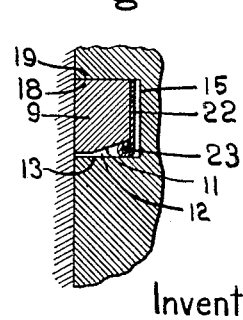
Figure 8:
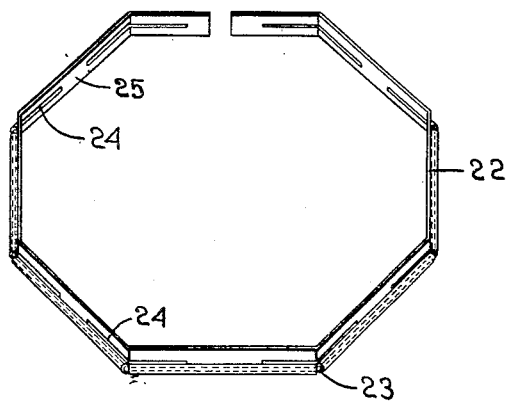
Fig. 8 is a perspective view of the expanding means illustrated in Fig. 5.

In the construction shown in Fig. 5 the two expanding members 14 and 20 are not secured together but may expand or contract entirely independently of each other. A further modification of the invention is illustrated in Figs. 6 and 8 in which an expanding member 22 is inserted in the groove in the same manner as the member 20 and functions to increase the expansion of the body portion outwardly against the cylinder wall. The edge of the member 22 which is adjacent to the beveled face 11 is beaded over to enclose an expansion member 23 similar to the member 14. In order that the combination of the members 22 and 23 thus formed may be installed as a unit to permit each of the expanding members to function substantially independently of each other, a series of slots 24 are cut in the member 22, and are of such a length that only a small section 25 of the metal is unsevered, which permits the maximum tension of the member 21 to be effective in expanding the body portion outwardly and at the same time permitting the member 23 to seek its own bearing points to wedge the body portion 9 into engagement with the side wall of the groove.

In the construction employing a one piece rectangular piston ring it is practically impossible to produce a gas tight fit between the ring and its groove since the ring must be free to expand laterally against the cylinder wall within its groove. A slight clearance is therefore always initially present between the ring and its groove which permits a slight longitudinal motion of the ring if no supplementary device is utilized to prevent it. As the piston reciprocates within the cylinder the ring contacts first with one side wall of the groove and then the other during alternate cycles of compression and of suction. This constant pounding of the ring in the groove causes wear and roughening of the grooved surfaces thereby greatly decreasing the effective sealing of the piston rings. This motion of the ring within its groove also causes oil to be pumped into the combustion chamber which is a very undesirable condition.

By thoroughly sealing the ring in its groove and locking it against movement therein the present invention positively eliminates oil pumping, and furthermore the sealing of the ring in the groove is effectively accomplished, and with substantially no sacrifice in the strength of the ring.

Having thus described the invention, what is claimed as new, and desired to be secured by Letters Patent is:

1. An expansion member for a piston ring seated in a groove in the piston having at least a portion of one of its end faces inclined at an angle to the adjacent side wall of the groove forming therewith an inwardly opening V-shaped recess comprising a peripheral expanding member of polygonal form and L-shaped in cross section having its lateral section adjacent the inclined face of the body portion, said expanding member engaging the bottom wall of the groove and expanding outwardly against the inner face of said body member to increase the peripheral pressure thereof with the cylinder wall, and a second peripheral expanding member engaging the two concave faces of the L-shaped expanding member and expanding laterally into the said recess acting to wedge the lateral section of the L-shaped expanding member into contact with the adjacent side wall of the groove and simultaneously wedging the body portion into engagement with the opposite side wall of the groove.

2. An expansion member for a piston ring seated in a groove in the piston having at least a portion of one of its end faces inclined at an angle to the adjacent side wall of the groove forming therewith an inwardly opening V-shaped recess comprising a peripheral expanding member of polygonal form comprising a flat portion inserted between the bottom wall of the groove and the inner face of the body portion acting to increase the peripheral pressure thereof against the cylinder wall and having a portion of one of its edges secured to a second expanding portion adjacent to and expanding into said recess to wedge the body portion against a side wall of the groove, the portion of the flat section carrying the second-named expanding portion being partially severed from the rest of said flat portion substantially as described to enable each portion of the expanding member to function substantially independently of the other.

3. An expansion member for a piston ring seated in a groove in the piston and having at least a portion of one of its end faces inclined at an angle to the adjacent side wall of the groove forming therewith an inwardly opening V-shaped recess comprising a peripheral expanding member of polygonal form within the groove having a laterally projecting portion adjacent the inclined face of the body portion of the ring and expanding laterally into said recess engaging the inclined face and the adjacent side wall of the groove to wedge the body portion into engagement with the opposite side wall of the groove, said expanding member having also a vertical portion situated between the bottom wall of the groove and the inner wall of the body portion acting to increase the peripheral pressure of the body portion against the cylinder wall, the lateral portion of the expanding member being partially severed from the vertical portion to enable each portion thereof to function substantially independently of each other.

In testimony whereof, I have signed my name to this specification.

LESLIE J. THOMAS.